United States Patent [19]

Voyles

[11] 4,001,656

[45] Jan. 4, 1977

[54] CAPACITOR HAVING A PLURALITY OF ANODE RISERS FOR LOW IMPEDANCE AT HIGH FREQUENCY

[75] Inventor: Gerald A. Voyles, Indianapolis, Ind.

[73] Assignee: P. R. Mallory & Co. Inc., Indianapolis, Ind.

[22] Filed: Dec. 27, 1974

[21] Appl. No.: 536,812

[52] U.S. Cl. .............................. 317/230; 317/242; 357/72

[51] Int. Cl.² ..................... H01G 9/00; H01G 9/16; H01L 23/28

[58] Field of Search .............. 317/230, 242; 357/72

[56] References Cited

UNITED STATES PATENTS

| | | | |
|---|---|---|---|
| 2,627,538 | 2/1953 | Brennan | 317/230 |
| 3,010,056 | 11/1961 | Kurland et al. | 317/230 |
| 3,586,924 | 6/1971 | Gebert | 317/230 |
| 3,676,753 | 7/1972 | Norman | 317/230 |
| 3,792,323 | 2/1974 | Stockman | 317/242 |
| 3,806,770 | 4/1974 | Voyles et al. | 317/230 |

Primary Examiner—Andrew J. James
Attorney, Agent, or Firm—Hoffmann & Meyer

[57] ABSTRACT

The disclosure relates to an electrical component with low impedance over a range of high frequency input signals. The electrical component comprises a body including a metal anode with a plurality of anode risers contacting the anode, each of the anode risers extend from the anode a relatively short distance with a minimum of spacing therebetween. Anode and cathode levels extend from the body a relatively short distance in spaced substantially parallel relationship with each other. Preferably, the lengths of the anode and the cathode leads are a minimum as well as is the distance between each of the leads in order to further help reduce the impedance of the electrical component over a range of high frequency input signals. An example of an electrical component body is a solid tantalum capacitor comprising an anode of a dielectric oxide film-forming metal with a myriad of intercommunication voids, a dielectric oxide film of the metal contacting surfaces of the anode, and an electrolyte material contacting the dielectric oxide film.

11 Claims, 9 Drawing Figures

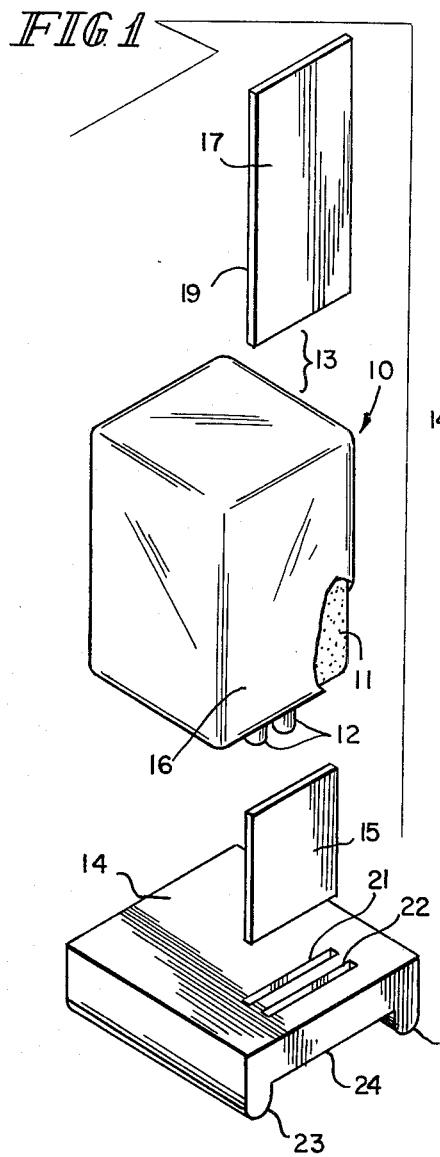
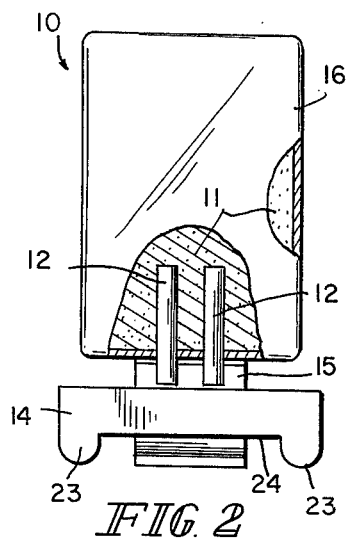
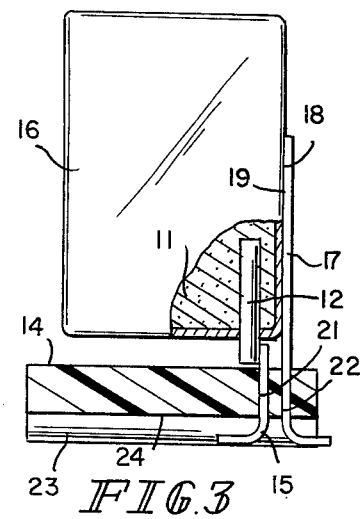
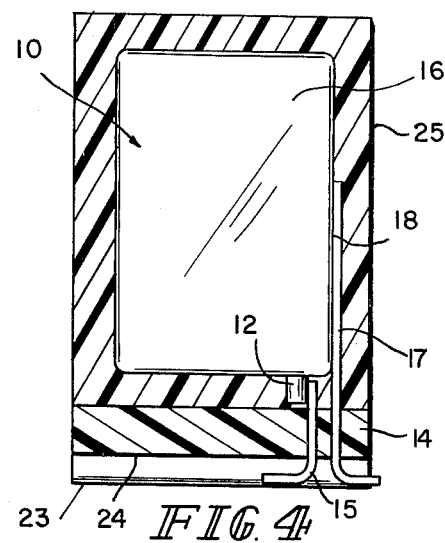
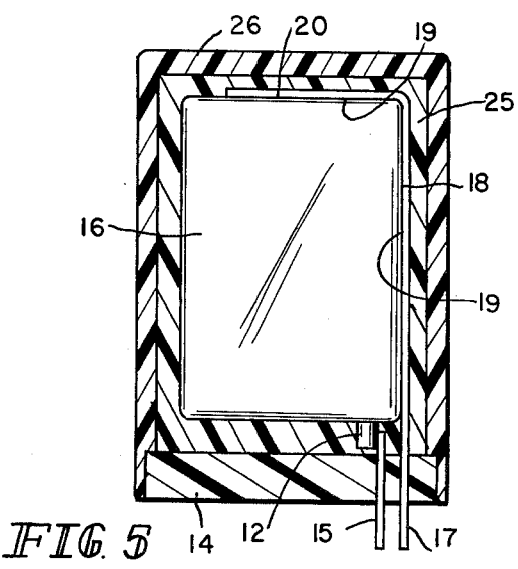
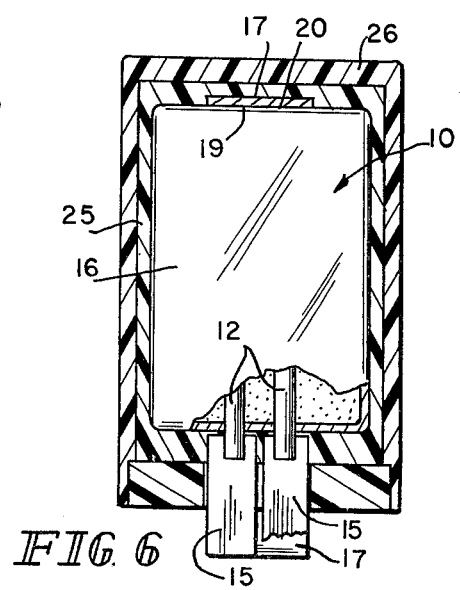

CAPACITOR HAVING A PLURALITY OF ANODE RISERS FOR LOW IMPEDANCE AT HIGH FREQUENCY

The present invention relates to an electrical component with a relatively low impedance at high frequency input signals, and, more particularly, to an electrical component having a body including an anode with a plurality of anode risers contacting the anode. The plurality of anode risers contacting the anode helps to reduce high frequency impedance of the electrical component over that of an electrical component having a body with a single anode riser contacting the anode. Preferably, the lengths of the anode risers are a minimum and parallel to each other with a minimum of distance separating the anode risers to further help reduce the impedance of the electrical device over a range of high frequency input signals.

"Electrical component" as used herein means and includes capacitors and other types of electrical devices intended for use at high frequency where it is desired that the impedance at high frequency be a minimum. For the purpose of clarity and not for the purpose of limitation, the concepts of the present invention will be discussed in relation to a solid tantalum capacitor adapted for use at high input frequencies, that is, at frequencies up to and including 100 MHz and higher.

"Impedance" as used herein means and includes the opposition to electron flow when an alternating voltage is present.

"Solid tantalum capacitor" as used herein means and includes a capacitor having a tantalum anode with a myriad of intercommunicating voids, a dielectric oxide film of tantalum contacting the anode and a solid electrolyte material contacting the dielectric oxide.

"Strip lead" as used herein means and includes a substantially flat, elongated and relatively narrow electrically conducting material.

"Wire-like lead" as used herein means and includes an electrically conducting elongated slender rod of substantially circular cross-section.

The anode of the electrical component includes a plurality of anode risers extending from the anode in substantially the same direction with a short length of a lead or individual leads of electrically conducting material attached to each of the anode risers. The number of anode risers and the nature of their physical contact with the anode, their position with respect to each other and the use of particular types of lead configurations attached to the anode risers help to reduce the impedance of a solid tantalum capacitor adapted for use at high frequencies.

A conventional way of terminating a solid tantalum capacitor is to weld an elongated lead wire to an anode riser extending from the anode and to solder an elongated wire to the cathode side of the capacitor body as shown in U.S. Pat. No. 3,343,047. One of the elongated lead wires extends from the anode riser of the anode of the capacitor and the other of the elongated wires extends from the cathode side of the capacitor. This form of termination of a capacitor body tends to have undesirable impedance values at high operating frequencies, that is, an undesirable impedance value at input frequencies of 1 MHz or higher.

By using a plurality of anode risers extending from the anode of a capacitor in substantially the same direction and of a relatively short length with a particular type of lead configuration such as strip lead, or individual wire-like leads, or a substantially U-shape wire-like lead attached or joined to the anode risers, it has been found that the impedance value of such a capacitor is significantly reduced at high operating frequencies over a capacitor with an anode having a single anode riser. It has also been found that the impedance value of the capacitor at high input frequencies can be further reduced, provided the cathode has joined or attached to it either a relatively short length of a strip lead, or a wire-like lead, or a substantially U-shaped wire-like lead and is parallel to and separated by a short distance from the anode lead or leads joined to the anode risers. Preferably, the impedance value of the electrical component of the present invention is 1 ohm or less at input frequencies of 1 MHz or higher. A feature of the invention is to provide an anode having a plurality of anode risers extending therefrom a relatively short distance, preferably, with either a strip lead, or strip leads, or individual wire-like leads, or a substantially U-shaped wire-like lead of electrically conducting material joined to the anode risers. A further feature of the invention is to provide an electrical component body including an anode with a plurality of anode risers extending therefrom and a short length of an anode strip lead, or anode strip leads, or individual wire-like leads, or a substantially U-shaped wire-like lead of electrically conducting material attached to the anode risers, and a cathode including a short length of a cathode strip lead, or a wire-like lead, or a U-shaped wire-like lead of electrically conducting material, each of the leads (whether anode or cathode) projecting a short distance from the electrical component body in substantially the same direction. Another feature of the present invention is to provide an electrical component body with an anode having a plurality of anode risers extending therefrom which helps provide isolation of electrical current associated with the high frequency input signal from electrical current associated with the output signal of the electrical component body. Other features of the invention will become more apparent from the drawings, the following description and appended claims.

In the drawing:

FIG. 1 is an exploded, isometric view of the electrical component including a body, a plurality of anode risers extending from the body, a single anode strip lead joined to the risers, and a cathode strip lead joined to the cathode of the body;

FIG. 2 is a front elevational view with portions removed of the electrical component of FIG. 1;

FIG. 3 is a side section view of the electrical component device of FIG. 1;

FIG. 4 is a side section view of the electrical component means of FIG. 1 showing encapsulation of the electrical component means;

FIG. 5 is a side section view of the electrical component means comprising a plurality of anode risers, a plurality of anode strip leads joined to the risers and showing encapsulation of the electrical component means;

FIG. 6 is a front section view of FIG. 5;

Figure 7:
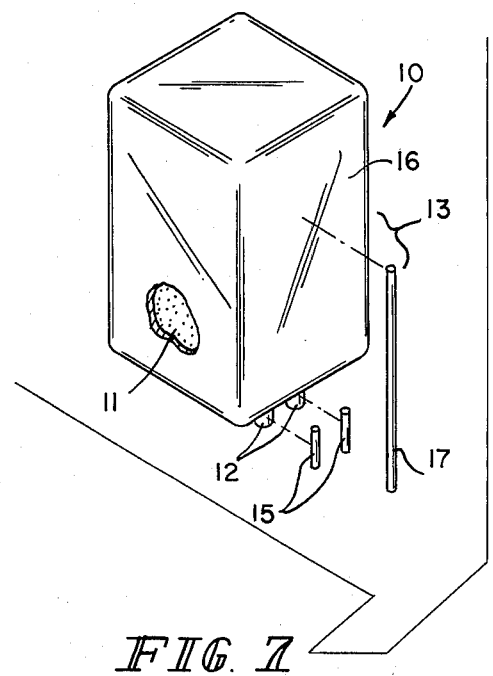
FIG. 7 is an exploded, isometric view of the electrical component including individual wire-like leads attached to the anode risers, and a wire-like lead attached to the cathode of the body.

Referring now to FIGS. 1 through 9 of the drawing, an electrical component 10 includes an anode body 11 with a plurality of anode risers 12 extending from the anode 11 and separated from each other by a suitable dielectric such as air, a cathode 13 contacting the anode body 11, and, optionally, an electrically insulating base 14 with an encapsulant 25. Note base 14 is not shown in FIGS. 7 to 9 and an encapsulant 25 is not shown in FIGS. 1 to 3, 7 and 8.

As illustrated in the several FIGURES of the drawing, the electrical component 10 includes an anode body 11 and a plurality of anode risers 12 extending from the anode body in substantially the same direction and separated by a short distance. The anode risers 12 may be joined or attached to the anode body 11 by any suitable means which intimately joins or attaches the risers to the anode body 11 and has associated with such joining or attaching method low electrical contact resistance. Suitable joining or attaching may be accomplished by welding or pressing the anode risers 12 into a mass of metal powder used to form the anode body 11. The ends of the anode risers 12 extending from the anode body 11 provide multiple electrical connection to the anode side of the electrical component 10.

Although not theoretically understood, it has been found that the use of two closely spaced parallel anode risers extending from an anode body 11 in substantially the same direction as illustrated in the drawing appears to have about the same beneficial affect on reducing the impedance of an electrical component at high frequency as three, four or more closely spaced parallel anode risers extending from an anode body 11 in substantially the same direction. However, an anode body 11 with three or more of anode risers does have lower impedance at high frequency input signals than does an anode body 11 with but a single anode riser 12 extending from the anode body 11 at the same high frequency input signal. Therefore, the present invention contemplates the use of two or more anode risers 12 extending from the anode body 11. The use of a plurality of closely spaced parallel anode risers 12 intimately joined to and extending from the anode body 11 seems to help isolate current associated with the high frequency input signal from the output signal of the electrical component thereby aiding in reducing the impedance of the electrical component 10 appearing at the output side of the electrical component. The contribution of inductive reactance and capacitive to the impedance in ohms of the electrical component 10 is frequency dependent. By minimizing the effect of the frequency associated with the input signal on the impedance of the electrical component 10 at its output, it seems to follow that the impedance appearing at the output of the component should be reduced. Surprisingly, it was found that the use of plural anode risers 12 as described herein reduced the impedance of the electrical component 10 at high input frequencies, by, it is thought, to an extent isolating the current associated with the input signal from the output of the component.

It is important that the plurality of anode risers 12 extend from the anode body 11 in spaced substantially parallel relationship and in the same direction. In the event anode risers 12 extend from opposite ends or sides of the anode body 11, the affect on reducing the impedance of the electrical component device is not as great as having the anode risers 12 extend in the same direction in minimum distance from the same end or side of the anode body and spaced from each other a short distance.

Preferably, the anode body 11 and anode risers 12 illustrated in the drawing are made of the same dielectric oxide film-forming metal. Suitable dielectric oxide film-forming metals are tantalum, aluminum, niobium and the like. The anode body 11 is formed from joined together metal powder and includes a myriad of intercommunicating voids (not shown). As shown in the drawing, the volume of the anode body 11 is substantially greater than the total volume of the several anode risers 12. Surfaces of the anode body 11 are contacted by a suitable dielectric (not shown) such as an oxide film of metal of the anode body. A suitable solid electrolyte (not shown), such as manganese dioxide, contacts the dielectric oxide film.

Figure 8:
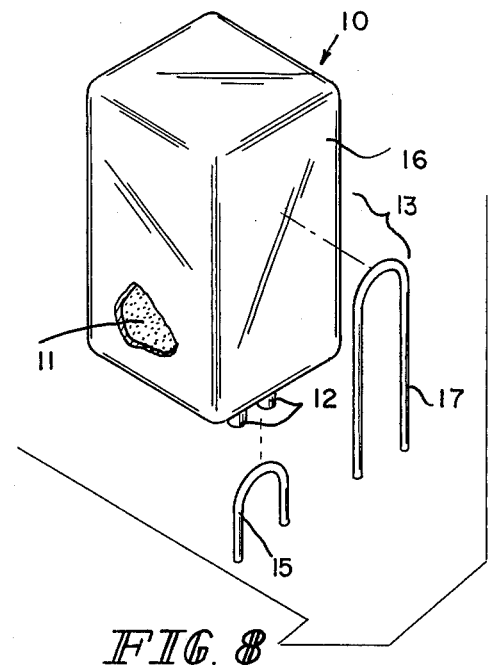
FIG. 8 is an exploded isometric view of the electrical component including substantially U-shaped wire-like ...ads attached to the anode risers and attached to the cathode of the body.
Figure 9:
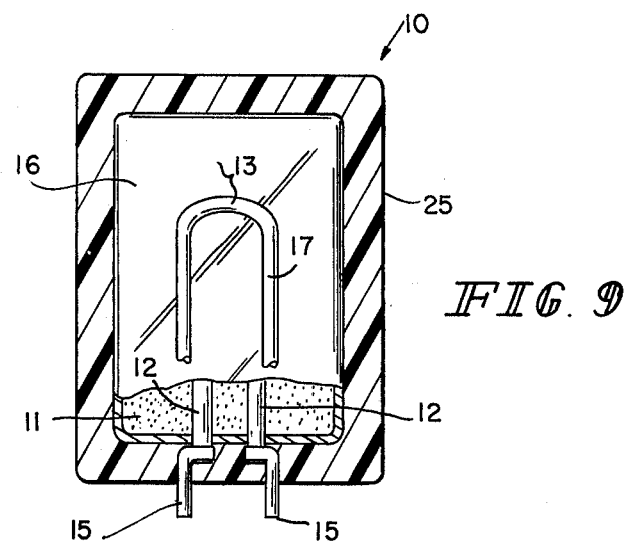
FIG. 9 is a front section view of wire-like leads attached to the anode risers and to the cathode of the body.

As shown in FIGS. 1 to 4, the anode risers 12 have suitably attached thereto a single anode strip lead 15 of electrically conducting metal. The anode strip lead 15 has a width dimension associated with it so as to allow it to be joined or attached to each of the anode risers 12 and span the distance separating the anode risers. Separate anode strip leads 15 may be used to contact each anode riser 12 extending from the anode body 11 as shown in FIGS. 5 and 6 of the drawing. It is seen that if the anode body 11 has two anode risers 12 extending therefrom, it may have two separate anode strip leads 15, three anode risers 12 three separate anode strip leads etc. Separate wire-like leads 15 may be used to contact each anode riser 12 extending from the anode body 11 as shown in FIGS. 7 and 9. A substantially U-shaped wire-like lead 15 may be used to contact each anode riser 12 extending from the anode body 11 as shown in FIG. 8 of the drawing. The anode strip lead or strip leads and the wire-like lead or leads 15 are of an electrically conducting and relatively rigid material such as nickel, solder coated nickel, copper, a copper base alloy, nickel coated with silver or the like. It is presently preferred that the material be nickel coated with solder.

The cathode 13 includes cathode coating 16 attached or joined to either a cathode strip lead 17 as shown in FIGS. 1 to 6, or a wire-like cathode lead 17 as shown in FIGS. 7 and 9, or a U-shaped wire-like cathode lead 17 as shown in FIG. 8 of the drawing. The cathode coating 16 is a suitable electrically conducting material such as metallic paint, solder or the like. The cathode strip lead and the wire-like lead 17 are an electrically conducting and relatively rigid material such as nickel, solder coated nickel, copper, a copper base alloy, nickel coated with silver or the like. It is presently preferred that the cathode strip lead and the wire-like lead 17 be nickel coated with solder.

The relatively rigid characteristic of the strip lead 17 and the relatively large area of the strip joined or attached to surface 18 of the cathode coating 16 helps to provide a vibration and abusive handling resistant cathode connection of low electrical contact resistance. As shown in FIGS. 3 and 4 of the drawing, surface 19 of the cathode strip lead 17 of the cathode 13 immediately adjacent surface 18 of the cathode coating 16 is intimately joined or attached to the cathode coating 16 by any suitable means such as by soldering or the like to help reduce electrical contact resistance between cathode coating and the cathode strip lead. The portion of the length of the strip lead 17 contacting surface 18 of the cathode coating 16 as illustrated in FIGS. 1 through 4 does not appear to be critical to the operation of a capacitor at high input frequencies. However, the larger the area of the surface 18 of the cathode strip lead 17 contacting the anode coating 16, the greater the mechanical support imparted to the capacitor by the elongated strip 17.

In FIGS. 5 and 6 it should be noted that surfaces 19 of the cathode strip lead 17 are intimately joined or attached to the surfaces 18 and 20 of the electrical component 10, and have width and length dimensions forming a surface area equal to or greater than one-half the area of the surfaces 18 and 20 of the component 10 to which the surface 19 of the cathode strip lead 17 is joined or attached. It should also be noted that a 90° angle is between adjacent surfaces 18 and 20 of the electrical component 10 joined or attached to the surface 19 of the elongated cathode strip 17. The configuration of the cathode strip lead 17 illustrated in FIGS. 5 and 6 appears to provide to the capacitor more resistance to the harmful effects of vibration, abusive handling and the like than does the cathode strip lead 17 configuration illustrated in FIGS. 1 through 4. A capacitor with the cathode strip lead 17 illustrated in FIGS. 5 and 6 has little, if any, higher impedance value at high frequency than a capacitor with the cathode strip lead 17 illustrated in FIGS. 1 through 4.

To achieve maximum benefit of minimum impedance at high operating frequencies, it is important (i) that the anode lead or leads 15 and the lead 17 project a relatively short distance from the component 10 in substantially spaced, parallel relationship, and in substantially the same direction; (ii) to minimize the length of each of the leads 15 and 17 from the point of last intimate contact or engagement with the anode body 11 to the distal end of each of the leads 15 and 17; and (iii) to minimize the distance separating the anode risers 12 and separating the lead or leads 15 from the lead 17.

Comparative data are given in Tables I and II to illustrate the difference, and the significant difference in the impedance value observed at operating frequencies of 1 MHz and higher. Impedance data at various input frequencies are given in Table I for a single anode wire lead and a single cathode lead wire capacitor. Impedance data at various input frequencies are given at Table II for a capacitor having a plurality of anode risers as shown in FIGS. 1 through 4 of the drawing. The single anode lead wire capacitor is similar to the capacitor of FIGS. 1 through 4 of the drawing but for the plurality of anode risers 11 and lead connections. The anode of each capacitor is tantalum with a myriad of intercommunicating voids. The tantalum anode surface is contacted by a dielectric film of an oxide of tantalum. The dielectric is contacted by an electrolyte that includes solid manganese dioxide. The electrolyte is contacted by solder and the capacitor is encapsulated in epoxy. The rating of each capacitor is about 50uF at 10 Vdc. The test circuit includes a vector volt meter.

TABLE I

| Frequency | 1MHz | 10MHz | 100MHz |
|---|---|---|---|
| Impedance (ohms) | 0.08 | 0.3 | 4 |

TABLE II

| Frequency | 1MHz | 10MHz | 100MHz |
|---|---|---|---|
| Impedance (ohms) | 0.08 | 0.08 | 0.6 |

At lower input frequencies, there does not appear to be a substantial difference between the impedance value of the single anode riser capacitor and the impedance value of the plural anode riser configuration of the present invention. A difference in the impedance value is evident at input frequencies of 1MHz, and a significant difference in impedance value is noted at input frequencies of 10MHz and higher.

The base 14 shown in several Figures of the drawing may be formed from any suitable electrically insulating, substantially rigid thermosetting or thermoplastic material such as BAKELITE plastic, plastic, nylon or the like. A presently preferred material for the base 14 is polypropylene or thermosetting plastic resin. Preferably, the material of the base 14 is compatible with the material to be employed for encapsulating the electrical component 10.

The base 14 has 2 apertures 21 and 22 formed therein, and two standoff means 23 extending from the surface 24 of the base. The apertures 21 and 22 formed in the base 14 are used to receive leads 15 and 17 extending from the anode body 11. A function of the standoff means 23 is to provide the base 14 with a suitable foundation that is firm when engaged with a mounting means (not shown) such as a mounting panel. Variations of the configuration of the standoff means 23 may be used to identify the electrical polarity of the leads 15 and 17 extending from the electrical component 10. Alternatively, polarity identification of the terminal means of the electrical component device may be provided by suitable characters (not shown) formed in the base 14.

The anode lead or leads 15 and the cathode lead 17 are inserted into apertures 21 and 22 of the base 14 by aligning the extremities of each of the leads 16 and 17 with the apertures and moving the anode body 11 into spaced relationship with respect to the base 14 so that the extremities of each of the elongated strips 15 and 17 project through the apertures 21 and 22 and beyond the standoff means 23 associated with the base 14 a suitable distance. Each of the leads 15 and 17 are suitably joined to the base 14 by encapsulating the anode body 11 in a manner described hereinafter. The cross-sectional dimensions of the anode lead or leads 15 and the cathode lead 17 in relation to the cross-sectional dimensions of the apertures of the base 14 are such that manual or machine insertion of the leads 15 and 17 into the apertures of the base 14 may be readily accomplished.

Having provided the electrical component body 11 in cooperative association with the base 14, the electrical component 10 may be suitably encapsulated. FIG. 4 shows one form used to encapsulate the electrical component 10. Encapsulant 25, a suitable electrically insulating resinous material such as a thermoplastic or thermosetting material, is formed over the anode body 11 so as to substantially completely encapsulate the anode body 11 and join the base 14 to the insulating resinous encapsulant 25. One method of encapsulating the anode body 11 is to place the anode body 11 in cooperative association with base 14 in a suitable mold cavity (not shown). The anode body 11 is supported in the mold cavity by the base 14 and the standoff means 23. Suitable thermoplastic or thermosetting resinous material compatible with the material of the base 14 and the anode body 11 is injected into the mold to substantially cover the anode body 11. Preferably, the material used to form the encapsulant 25 and the material of the base 14 are the same. Suitable thermoplastic materials for injection molding that are compatible with the materials of the solid type capacitor body include polypropylene, polystyrene, polycarbonate and urethane resins. It is possible to use epoxy, diallylphthalates, phenolic and other thermosetting resins capable of molding in which do not harmfully effect the electrical component body 10.

Another form (not shown) of encapsulating the electrical component 10 is achieved by immersing or dripping the body 11 in a liquid bath (not shown) of electrically insulating resinous material such as thermoplastic or thermosetting resins of the type given above so as to provide an encapsulant 25 of such resin.

An electrical component 10 having added protection against abusive handling is shown in FIGS. 5 and 6. Body 11 is inserted into mylar sleeve 26. The inside diameter of the sleeve 26 is slightly greater than the outside diameter of the body 11. Void volumes between the inner wall of the sleeve 26 and the body 11 are filled with a suitable potting or filler encapsulant 5. The potting material or filler encapsulant 25 may include length as suitable dielectric filler reinforcement (not shown). A suitable dielectric fiber reinforcement includes mineral fibers such as glass, asbestos, calcium carbonate, inorganic fillers such as macerated nylon.

The embodiments shown in FIGSs. 4 to 6 ideally include at least the outer periphery of the surface of the base 14 covered by encapsulant 25. Ideally, encapsulant 25 has moved into the apertures 21 and 22 to substantially fill each.

As shown in FIGS. 7 to 9, the base 14 is not used in order to minimize the length of the leads 15 and 17 extending from the body 11 and the cathode coating 16 to thereby reduce the ohmic value at the output of the electrical components 10 illustrated in FIGS. 7 to 9. FIG. 9 shows an encapsulant 25 used to provide electrical component 10.

It should be understood that many widely different embodiments of this invention may be made without departing from the spirit and scope thereof, it is to be understood that the invention is not limited to specific embodiments hereof, except as applied in the appended claims.

What is claimed is:

1. A capacitor having low impedance at high frequency input signals comprising a body including a dielectric oxide film-forming metal containing anode with a myriad of intercommunicating voids, a cathode contacting the body, and a plurality of individual anode risers contacting the anode, each of the anode risers extending from the anode in substantially the same direction.

2. The capacitor of claim 1, wherein the plurality of anode risers extend from the anode a relatively short distance.

3. The capacitor of claim 1, wherein the anode risers are separated by dielectric material.

4. The capacitor of claim 3, wherein the anode risers are spaced a relatively short distance from each other.

5. The capacitor of claim 4, wherein the volume of the anode is substantially greater than the total volume of the anode risers.

6. The capacitor of claim 1, wherein each of the anode risers has attached to it either an anode strip lead or wire-like leads or a substantially U-shaped wire-like lead.

7. The capacitor of claim 6, wherein the anode strip lead is a single strip lead attached to each of the anode risers or a substantially U-shaped wire-like lead.

8. The capacitor of claim 6, wherein the cathode includes either a cathode strip lead, or wire-like lead, or a substantially U-shaped wire-like lead extending from the body a relatively short distance in spaced substantially parallel relationship with the anode lead or leads.

9. The capacitor of claim 1 including a dielectric oxide film of the metal contacting surfaces of the anode and an electrolyte material contacting the dielectric oxide film.

10. The capacitor of claim 9, wherein the film-forming metal is tantalum and the electrolyte material is substantially solid.

11. An anode of a dielectric oxide film-forming metal with a myriad of intercommunicating voids, a plurality of individual anode risers contacting the anode, each of the risers extending from contact with the anode a relatively short distance and in substantially the same direction.

* * * * *

UNITED STATES PATENT AND TRADEMARK OFFICE
CERTIFICATE OF CORRECTION

PATENT NO. : 4,001,656
DATED : January 4, 1977
INVENTOR(S) : Gerald A. Voyles

It is certified that error appears in the above-identified patent and that said Letters Patent are hereby corrected as shown below:

In the Abstract, line 8, delete "levels" and insert ---leads---

In the Abstract, line 17, delete "intercommunication" and insert ---intercommunicating---

Column 2, line 17, start a new paragraph with "a feature---"

Column 3, line 53, after "capacitive" insert ---reactive---

Column 7, line 17 and 18, delete "dripping" and insert ---dipping---

Signed and Sealed this

Twentieth Day of September 1977

[SEAL]

Attest:

RUTH C. MASON
Attesting Officer

LUTRELLE F. PARKER
Acting Commissioner of Patents and Trademarks